April 19, 1927.
F. A. PEARL
1,625,421
COASTER WAGON STEERING GEAR
Filed Feb. 26, 1923
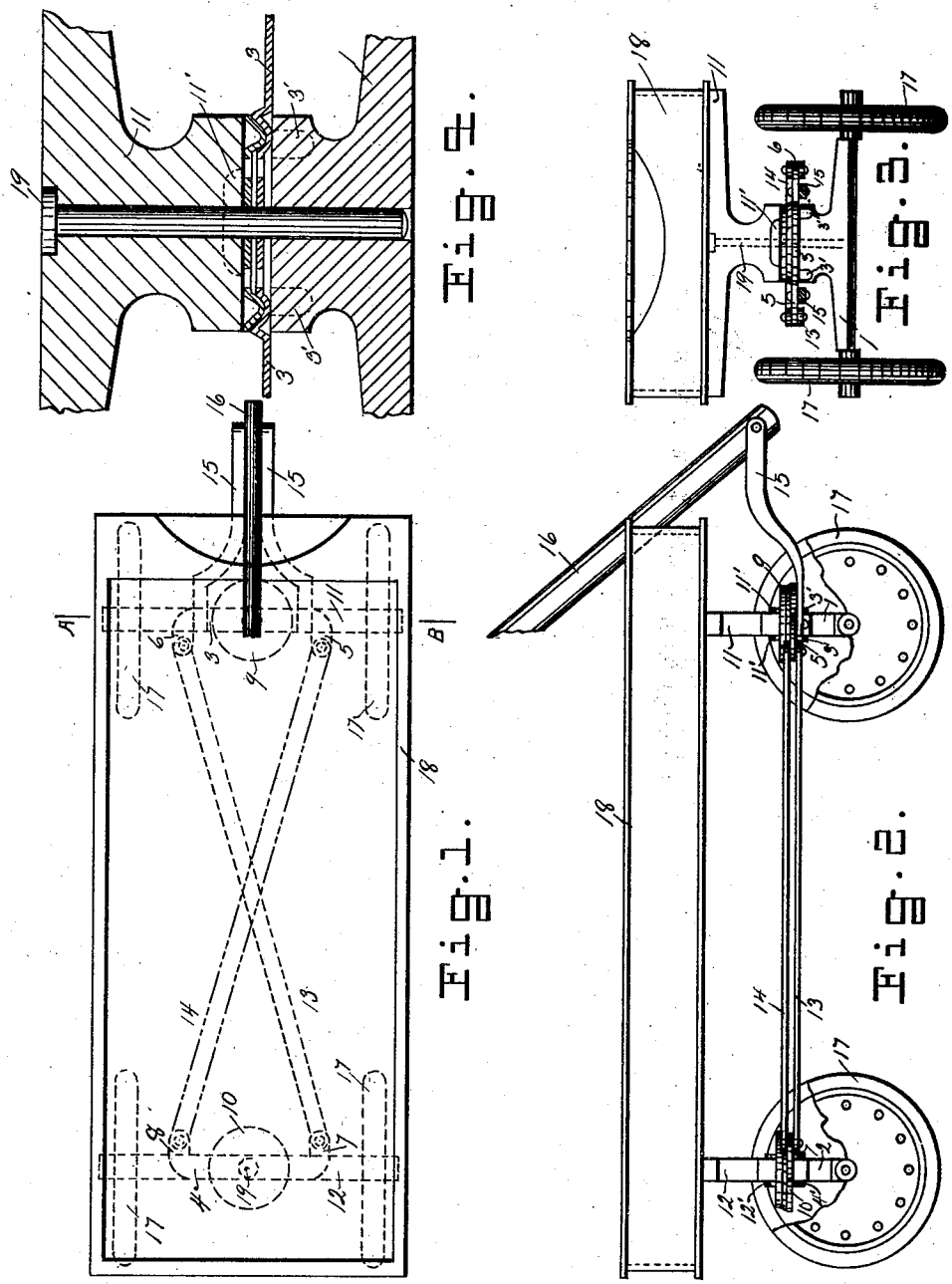
WITNESS:
Frances French
INVENTOR.
FRANK. ALEXANDER. PEARL.
BY
Charles Albert French
ATTORNEY.

Patented Apr. 19, 1927.

1,625,421

UNITED STATES PATENT OFFICE.

FRANK ALEXANDER PEARL, OF MADISON, WISCONSIN.

COASTER-WAGON STEERING GEAR.

Application filed February 26, 1923. Serial No. 621,469.

My invention relates to steering gears for coaster wagons; and the objects of my invention are, first, to be able to turn both front and rear axles simultaneously by a movement of the wagon tongue; second, to prevent the front axle being turned under the box so that it will be in longitudinal alignment with the same; and third, to provide an arrangement of the axles and wheels whereby a short turn may be made without the danger of turning over, so common to such vehicles.

I attain these objects by the mechanism shown in the accompanying drawings in which—

Fig. 1, is a plan;
Fig. 2, is a right side elevation;
Fig. 3, is a front elevation;
Fig. 4, is a partial vertical section on line A—B, Fig. 1.

The front axle bed 1 and the rear axle bed 2 are duplicates, and upon the top of both a particular form of fifth wheel is located, said fifth wheel comprising a metal plate with a hole for receiving a king bolt and grooves concentric with the same a distance outward, with two arms oppositely disposed and extending outward from the grooves, the ends of the arms turned backward at right angles for attaching rods for a purpose hereinafter explained. Upon the top of bed 1 the plate is designated by the numeral 3 and the backwardly extending members as arms 5 and 6 with the fifth wheel as 9. Upon the bed 2 a duplicate plate 4 is secured with the arms pointing forward, said arms hereinafter referred to as arms 7 and 8, and the fifth wheel in the center as 10. Both plates are secured to the beds and prevented from turning or displacement by downwardly projecting lugs 3' and 4' on each side of the same. Bolster plates 10' are centrally concentrically corrugated to register with the fifth wheels and are secured to the under side of the bolsters 11 and 12, by flanges 11' and 12'. Holes are located centrally in the bolster and fifth wheel plates to receive a king-bolt 19. A connecting rod 13, is pivotally connected at its front end to the under side of arm 6, and at its rear end to the under side of arm 7. Connecting rod 14, is pivotally connected to the top of arm 5, at its front end, and to the top of arm 8, at its rear end. Arms 15, are secured to the under side of plate 3, and extend forward and upward, providing a means for attaching the handle or tongue 16. Wheels 17, are revolubly mounted on the axles in the usual manner, and a box or platform 18, is secured to the bolsters.

Having thus described my invention, I claim:

The combination with a wagon having an axle bed and a bolster, of a fifth wheel comprising a pair of discs provided with interfitting annular depressions, a plurality of angular arms oppositely located and integral with the sides of one plate of said fifth wheel, and ears on the discs to engage the axle bed and bolster respectively.

In testimony whereof I affix my signature.

FRANK ALEXANDER PEARL.